United States Patent
Koers et al.

(10) Patent No.: US 12,523,678 B2
(45) Date of Patent: Jan. 13, 2026

(54) PROBE CASSETTE AND METHOD FOR STORING, TRANSPORTING AND HANDLING ONE OR MORE PROBE DEVICES FOR A PROBE BASED SYSTEM

(71) Applicant: Nearfield Instruments B.V., Rotterdam (NL)

(72) Inventors: Johannes Gradus Martinus Koers, Rotterdam (NL); Servaas Louis Bank, Enschede (NL); Hamed Sadeghian Marnani, Rotterdam (NL)

(73) Assignee: Nearfield Instruments B.V., Rotterdam (NL)

( * ) Notice: Subject to any disclaimer, the term of this patent is extended or adjusted under 35 U.S.C. 154(b) by 25 days.

(21) Appl. No.: 17/928,172

(22) PCT Filed: May 28, 2021

(86) PCT No.: PCT/NL2021/050341
§ 371 (c)(1),
(2) Date: Nov. 28, 2022

(87) PCT Pub. No.: WO2021/242105
PCT Pub. Date: Dec. 2, 2021

(65) Prior Publication Data
US 2023/0213551 A1    Jul. 6, 2023

(30) Foreign Application Priority Data
May 29, 2020   (NL) ..................................... 2025702

(51) Int. Cl.
*G01Q 70/02*   (2010.01)
*G01Q 70/00*   (2010.01)

(52) U.S. Cl.
CPC ...................................... *G01Q 70/00* (2013.01)

(58) Field of Classification Search
None
See application file for complete search history.

(56) References Cited

U.S. PATENT DOCUMENTS

| 5,705,814 A | 1/1998 | Young et al. |
| 6,435,015 B1 | 8/2002 | Yamamoto |

(Continued)

FOREIGN PATENT DOCUMENTS

| CN | 111077347 A | 4/2020 |
| EP | 3819644 A1 | 5/2021 |

(Continued)

OTHER PUBLICATIONS

International Search Report and Written Opinion—PCT/NL2021/050341—mailing date Dec. 2, 2021.

(Continued)

*Primary Examiner* — Eliza W Osenbaugh-Stewart
(74) *Attorney, Agent, or Firm* — Banner & Witcoff, Ltd.

(57) ABSTRACT

A probe cassette for storing, transporting and handling one or more probe devices for a probe based system, the cassette including a body having at least one probe receptacle arranged to accommodate a probe device, wherein, at the probe receptacle, a vacuum clamping member is arranged for selectively holding the probe device under a retaining force, wherein the receptacle includes at least one aperture which is, during selective holding of the probe device, connectable to a vacuum pressure through a passageway arranged in the cassette body, wherein the cassette includes a first fluid port connectable to a first source of vacuum for delivering the vacuum pressure.

17 Claims, 10 Drawing Sheets

(56) References Cited

U.S. PATENT DOCUMENTS 8,925,111 B1 * 12/2014 Park .................. G01Q 70/02
850/29
2019/0317127 A1 10/2019 Sadeghian Marnani et al.

FOREIGN PATENT DOCUMENTS

| FR | 2964460 A1 | 3/2012 |
| JP | 2001-500958 A | 1/2001 |
| JP | 2002-323430 A | 11/2002 |
| JP | 2005-10059 A | 1/2005 |
| JP | 2006-250954 A | 9/2006 |
| WO | 9708733 A1 | 3/1997 |

OTHER PUBLICATIONS

International Search Report and Written Opinion—PCT/NL2021/050340—mailing date Dec. 2, 2021.

* cited by examiner

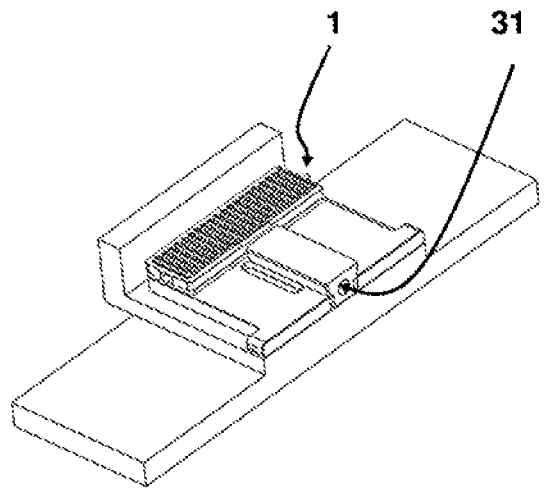
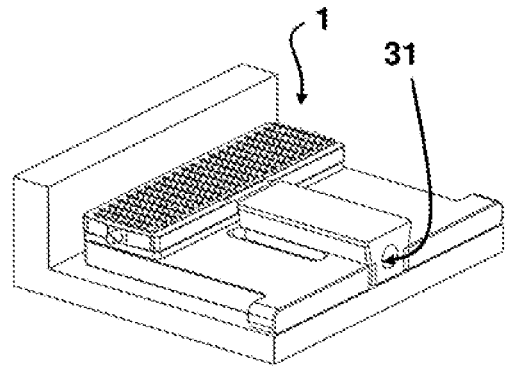
FIG 6A  FIG 6B
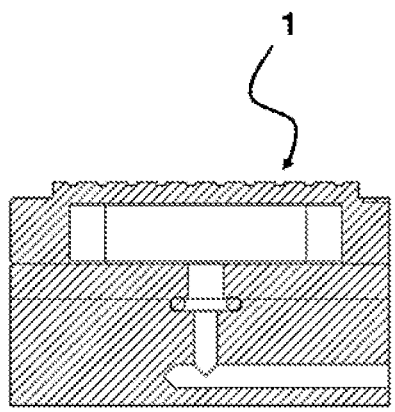
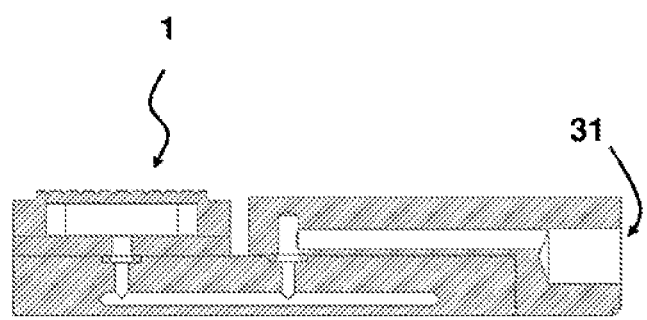
FIG 6C  FIG 6D

PROBE CASSETTE AND METHOD FOR STORING, TRANSPORTING AND HANDLING ONE OR MORE PROBE DEVICES FOR A PROBE BASED SYSTEM

CROSS-REFERENCE TO RELATED APPLICATIONS

This application is a U.S. National Stage application under 35 U.S.C. § 371 of International Application PCT/NL2021/050341 (published as WO 2021/242105 A1), filed May 28, 2021 which claims the benefit of priority to Application NL 2025702, filed May 29, 2020. Benefit of the filing date of these prior applications is hereby claimed. Each of these prior applications is hereby incorporated by reference in its entirety.

FIELD OF THE INVENTION

The invention relates to a cassette and method for storing, transporting and handling one or more probe devices for a probe based system. The invention further relates to a probe device delivery package.

BACKGROUND TO THE INVENTION

Probe-based systems such as scanning probe microscopes are widely used for characterizing properties of a sample by the interaction between a probe device and a sample. The probe device can be mounted in a scanning probe microscope (e.g. atomic force microscope). Different types of probe devices exist. Commonly, cantilever-based probe devices are employed. Such cantilever-based probe devices may have a tip to make a local measurement of one or more properties of the sample. Probe based systems can characterize small-scale sample features by monitoring the interaction between the sample and the tip of the associated probe device. Surface characterization, subsurface characterization, and/or other sample-dependent data can be determined over a particular region of the sample by providing a relative scanning movement between the tip and the associated probe device. Additionally or alternatively, the probe device may also be used for modifying the surface of the sample using the probe based system.

Probe devices used in scanning probe microscopy typically have very small dimensions and tend to require delicate handling. It is known to place one or more probe devices in a probe cassette for delivery to the user or customer in order to facilitate transport and prevent damage to the probe devices. The probe cassette may be container or holder including holding elements arranged for rigidly keeping the probe devices substantially in position even when transporting the cassette (e.g. shipment, on-site transport, handling, etc.). The probe devices may also be positioned in a gel box, having a gel for holding the probe devices in place.

A lid may be placed on top of the body of the cassette when the probe devices are loaded onto a body of the cassette. The lid may cover the probe devices when closed. Furthermore, the lid may be arranged to facilitate securing of the probe devices to the cassette for instance by using probe device retainers mounted on the underside of the lid. However, existing probe cassettes may not provide an adequate clamping. The mechanical clamping provided by such a lid or cover, may not be sufficient. Furthermore, the probe devices may displace when the lid or cover is opened or removed. In such cases, the cassette may not be able to absorb impact yet not damage the probe devices.

When closing the lid or cover of the probe cassette, a retainer arranged on or connected to said lid can damage the probe device. Additionally or alternatively, the lid may produce or transfer particles to the sample to be investigated by means of the probe based system (e.g. scanning probe microscope). Furthermore, mechanical clamping is available only for specific probe device body thickness, whereas thickness can variate depending on the probe device manufacturer.

There is a need for improving the clamping used in probe cassettes.

SUMMARY OF THE INVENTION

It is an object of the invention to provide for a method and a system that obviates at least one of the above mentioned drawbacks.

Additionally or alternatively, it is an object of the invention to provide for an improved clamping mechanism for probes usable in probe-based systems.

Additionally or alternatively, it is an object of the invention to reduce the risk of damage to probe devices during transportation or handling.

Thereto, the invention provides for a probe cassette for storing, transporting and handling one or more probe devices for a probe based system, the cassette including a body having at least one probe receptacle arranged to accommodate a probe device, wherein, at the probe receptacle, a vacuum clamping member is arranged for selectively holding the probe device under a retaining force, wherein at the receptacle at least one aperture is arranged, which is, during selective holding of the probe device, connectable to a vacuum pressure through a passageway arranged in the cassette body, wherein the cassette includes a first fluid port connectable to a first source of vacuum for delivering the vacuum pressure.

Advantageously, the cassette provides a way to keep probes on an accurately defined position with respect to each other using the selectively controllable vacuum clamping member. Probe devices can easily be placed and held by the cassette. Also subsequent removal of the probe devices from the cassette can be performed in a more controlled way.

Vacuum communicated to the vacuum clamping member may cause the probe device to be firmly held to the body of the cassette at the receptacle by the differential pressure acting on the probe device. An improved vacuum-based clamping mechanism is obtained for retaining the probe device in place on the body of the cassette. The chance that the integrity of the probe devices is compromised during handling, transportation, loading, mounting, etc. of the cassette can be reduced. The vacuum may generate a suction force applied to the probe device. This induced force (cf. tensile) can be sufficiently large for effectively fixating the probe device onto the body of the cassette. The vacuum clamping member can provide a reliable clamping mechanism requiring limited maintenance.

The vacuum clamping member can retain the probe device onto the body of the cassette without needing mechanical retaining means, for instance such as a lid arranged for covering and retaining the probe devices when the lid is closed. Hence, a clamping mechanism may be provided even if mechanical retaining means (e.g. lid) are removed (e.g. lid opened or removed). Furthermore, displacement of the probe devices carried by the probe cassette can be minimized, reducing the risk of potential damage to the probe devices as a result handling, transportation and/or loading in the probe based system (e.g. scanning probe microscope such as an atomic force microscope).

The vacuum clamping member provides a vacuum retaining mechanism which is more easily controlled, more accurate, more robust and/or less sensitive to the tolerances on dimensions with respect to other retainers configured for contacting and holding probe devices at one or more points (e.g. kinematic retainers). Additionally or alternatively, the vacuum retaining mechanism may enable easy alignment of the probe devices on the body of the cassette.

Optionally, the first fluid port is connectable to the first source of vacuum through a corresponding flexible tube. A non-flexible tube may also be used.

Optionally, the probe cassette includes a second fluid port connectable to a second source of vacuum. Different vacuum sources may provide vacuum to the vacuum clamping member of the cassette. In some examples, the vacuum source may be changed during clamping action by the vacuum clamping member. Advantageously, the clamping of the probe devices can be better guaranteed in this way.

The second fluid port may be different from the first fluid port. In this way, the cassette may be connected to different sources of vacuum. For instance, the cassette may be displaced and subsequently inserted in a probe based system with a first source of vacuum providing vacuum pressure to the vacuum clamping members. The cassette inserted in the probe based system may be connected to a second source of vacuum (e.g. machine vacuum pressure provided by the probe based system). The first fluid port may be disconnected, such that the cassette solely obtains vacuum pressure from the second source of vacuum. It is also envisaged that the first fluid port and the second fluid port are the same.

The probe cassette may include means for temporarily connecting a vacuum source thereto (e.g. through the first fluid port). Optionally, the cassette further includes means for automatically connecting to the second source of vacuum (machine vacuum) when the cassette is received in the probe based system. The first fluid port may be used for (temporarily) providing vacuum during handling and transfer of the cassette to the probe based system, and the second fluid port may be used for providing a machine vacuum as applied in the probe based system. In both cases, the same vacuum members may be used for fixating the probe devices in place using the induced retaining force as a result of the vacuum.

Optionally, the vacuum clamping member is adjustable between a first position, in which the vacuum pressure is sufficiently low for enabling vacuum clamping of the probe device, and a second position, in which the vacuum pressure is sufficiently high for allowing release of the probe device.

Optionally, the clamping force is controlled by controlling the vacuum pressure.

The probe device may be releasable by controlling a vacuum pressure provided to the vacuum clamping member. The pressure provided to the vacuum clamping member may be switched between at least two states, namely a vacuum clamping state and a non-clamping state. In the vacuum clamping state, vacuum pressure is provided to the vacuum clamping member for keeping the probe device in place on the body of the cassette. In the non-clamping state, no vacuum pressure is provided to the vacuum clamping member, enabling release of the probe device from the body of the cassette if the probe device is not retained by other means (e.g. form locked by a lid).

Optionally, the cassette further includes a lid mountable on the cassette substantially covering the at least one receptacle, the lid including means arranged for retaining the one or more probe devices on the body of the cassette, wherein the first fluid port is connectable to the first source of vacuum with the lid in a closed position.

The lid can be arranged such that it does not prevent connection of the first source of vacuum with the first fluid port, even if the lid is closed. When the lid is removed or opened, the probe devices may no longer be enclosed or retained to the cassette by means of the lid (e.g. form-lock). Advantageously, fixation may be maintained by means of the vacuum clamping, even during transferring with the lid opened or removed. The vacuum members may be used for imposing a temporary vacuum clamping.

Optionally, the cassette is arranged to be receivable in a probe device delivery package including a package base and a package lid connectable with each other, wherein the package lid is mountable over the body of the cassette so as to substantially cover the at least one receptacle, wherein at least one of the package lid or the body includes means arranged to retain the one or more probe devices on the body of the cassette, wherein the first fluid port is connectable to the first source of vacuum with the package lid in a closed position.

The lid may facilitate retaining the at least one probe device on the base of the cassette. Once the suction force induced by the vacuum clamping member is generated, the lid can be removed and the probe devices can be automatically loaded onto a probe mount of the probe based system (e.g. scanning probe microscope). It will be appreciated that the suction force can be exerted selectively before and/or after opening/removing the lid.

It will be appreciated that instead of providing a probe cassette receivable/mountable in a probe device delivery package, a cassette may be provided including a lid and a base, wherein in a closed state of the lid, the one or more probe devices positioned on the body of the cassette are covered by the lid.

Advantageously, it can be prevented that the probe devices can move with respect to the cassette or the lid, when lid is closed or open or being opened or being closed or when the cassette is placed in/out the machine or during handling. Particle contamination can also be prevented.

Optionally, the cassette includes a controller, wherein the controller is configured to adjust the retaining force exerted by means of the vacuum clamping member by controlling the vacuum pressure. The probe can be retained and selectively released by controlling the vacuum pressure.

Optionally, a value indicative of the vacuum pressure is monitored.

Optionally, the vacuum clamping member has at least one connection portion arranged to conform to a surface of the at least one probe device so as to form a sealing contact therewith. The body of the cassette at the receptacle may be arranged to have a complementary shape to a probe shape.

The receptacle may be adapted to form a seat for the probe device, wherein the probe device received in the seat is supported in a position allowing the connection portion of the vacuum clamping member to vacuum hold the probe device in position. Such a seat may for instance be formed by an indentation, a lowered plane, an inclined surface, etc. on the body of the cassette. The seat may optionally be arranged to provide form lock in at least one dimension, preferably at least two dimensions. Optionally, the receptacle has an inclined surface for facilitating seating of the probe device thereon.

Optionally, a plurality of apertures are arranged at the receptacle for vacuum retaining the probe device onto the body of the cassette during selective holding of the at least one probe device. In this way, the forces may be more evenly distributed over a surface of the probe device, allowing for an improved vacuum clamping.

Optionally, the vacuum clamping member includes a seal configured to provide a sealing interface with the probe device in order to substantially prevent leakage of gas.

In this way, a lower vacuum pressure can be maintained upon the probe device for holding the probe device fixed at the receptacle. The sealing may allow a precise control over the obtained suction force. Many types of seals can be used. The seal may also be formed by a portion of the body of the cassette (form seal). Additionally or alternatively, an elastic or rubber seal can be arranged for obtaining conformal sealing between a portion of the probe device (e.g. lower surface) and the body of the cassette. In an example, the vacuum clamping members include suction cups.

Optionally, the cassette includes a plurality of receptacles arranged in at least one array. The cassette may include a plurality of arrays. In this way, a large number of probe devices may be carried by means of the cassette. Each receptacle may receive at least one probe device.

Optionally, the body of the cassette includes several arrays/rows of probe device receptacles or pockets designed to accommodate probe devices of one or more types. The probe devices may be usable in different probe based systems.

Optionally, the cassette is mountable in a probe based system such that the one or more probe devices can be automatically loaded onto a probe mount of the probe based system.

The probe cassette may enable safe transportation and storage of the probe devices accommodated therein employing a vacuum-powered clamping fixture. Vacuum (cf. suction) is used for selectively clamping the probe devices to the body of the cassette.

The mounting of the probe device onto a probe mount of the probe based system may be performed in different ways, such as for example by means of vacuum clamping, mechanical clamping, electromagnetic force clamping, electrostatic force clamping and/or adhesive clamping.

Vacuum pressure may be generated outside the cassette by means of an external vacuum source. The cassette may be arranged for maintaining the vacuum provided to the vacuum clamping members for at least a predetermined period of time, even if the vacuum source is disconnected.

Optionally, vacuum is generated internally within the cassette. The cassette may include a vacuum source integrated therein for delivering a vacuum pressure. The vacuum may be generated by using a vacuum pump. The vacuum pump may for instance be connected to an electrical power source. The electrical power source may be external and/or internal (e.g. battery) to the cassette. An internal source of vacuum may provide a more integrated design. An external source of vacuum may be in fluid communication with the cassette via an air tube, or the like, connected to the fluid port of the cassette.

According to an aspect, the invention provides for a method of storing and transporting probe devices for a probe based system, the method including providing a probe cassette including a body having at least one probe receptacle arranged to accommodate a probe device, wherein the probe device is selectively held under a retaining force at the probe receptacle by means of a vacuum clamping member, wherein at the receptacle at least one aperture is provided, which is during selective holding of the probe device connected to a vacuum pressure, through a passageway arranged in the cassette body, wherein the probe cassette is provided with a first fluid port connectable to a first source of vacuum for delivering the vacuum pressure. The probe may be loaded back to the cassette, for instance after usage.

A pulling force can be selectively imparted on the probe device by means of the vacuum clamping member for retaining the probe devices in the probe cassette. The pulling force induced on the probe device by means of the vacuum clamping member can effectively hold the probe device at the receptacle on the body of the cassette. The resulting tensile/pulling force may be the result of the generated suction.

The vacuum clamping members may provide for a precise clamping mechanism not so much dependent on structure interaction with a structural element for holding the probe devices at the receptacles. Mechanical retainers may more easily deform, damage or scrape the probe devices. Moreover, the stiffness or clamping force achieved by the mechanical retainers can change in time. Such damage can be prevented by using the vacuum clamping members according to the invention. Moreover, by means of the vacuum clamping member, it can be easily prevented that the probe devices stick, upon removal of the lid, to the lid and/or or any member attached to the lid.

Optionally, the probe cassette is provided with a second fluid port connectable to a second source of vacuum.

Optionally, the retaining force exerted by means of the vacuum clamping member is adjustable by controlling the vacuum pressure. More control can be obtained over the clamping of the probe devices.

Optionally, a lid is mounted on the probe cassette substantially covering the at least one receptacle, the lid including means for retaining the one or more probe devices on the body of the probe cassette, wherein the method includes holding the probe device in position at the probe receptacle by means of the vacuum clamping member when the lid is to be opened and/or removed.

The cassette may include one or more further retaining mechanisms. Additionally or alternatively, the lid may include a form-lock retaining mechanism, wherein the probe devices are held in place by a form lock achieved when the lid is placed in in a closed position. The lid may cooperate with the probe devices for enabling a form lock for instance. In this case, the lid may not generate a retaining force. The retaining is achieved by form closing elements, without generating any clamping force.

The vacuum clamping members may be arranged to vacuum retain the probe devices during at least a portion of storing, handling, transporting, displacing and/or delivering of the cassette. The vacuum clamping members may selectively retain the probe devices during certain steps, for instance to prevent displacement of the probe devices when a retaining lid is opened/removed or when the cassette is moved with a retaining lid opened/removed. The cassette can be suitable for both transportation and storage of probe devices. Furthermore, the cassette may be (automatically) loadable in a probe based system.

Optionally, the first fluid port is connectable to the first source of vacuum with the lid being closed.

Optionally, wherein the second source of vacuum is different from the first source of vacuum, and wherein the method further includes: moving the probe cassette to the probe based system with the first fluid port connected to the first source of vacuum; connecting the second source of vacuum to the second fluid port of the probe cassette, the second source of vacuum being a machine vacuum of the probe based system; and disconnecting the first fluid port from the first source of vacuum.

The first vacuum source may be brought in fluid communication with the first fluid port by means of a (flexible) vacuum hose. Advantageously, vacuum is supplied to the first vacuum source before or at the moment the lid is opened. In this way, the risk for displacement of the probe devices on the body of the cassette can be limited as the the vacuum clamping members can keep the probe devices in place when the lid is opened or removed. The cassette can then be transported to the probe based system (e.g. atomic force microscope) while still being connected to the first vacuum source by means of the (flexible) vacuum hose. Once positioned within the probe based system, the cassette can be brought in fluid communication with the second vacuum source. The second vacuum source may be a machine vacuum. The (flexible) vacuum hose providing fluid communication to the first vacuum source can then be disconnected.

Optionally, the method includes determining the type of probe device being housed in the receptacle of the cassette, wherein based on the type of the probe device a vacuum suction (cf. tensile force) is adjusted. It will be appreciated that the vacuum clamping force induced by the vacuum clamping may also be considered as a force from the normal outside pressure which is not compensated on the other side. Optionally, the imposed tensile forces as a result of vacuum suction are chosen as high as possible without damaging the type of probe device being housed in the receptacle. For example, probe devices with solid silicon substrates for example may endure more force than probe devices with components or circuitry integrated thereon.

According to an aspect, the invention provides for a probe cassette for storing and transporting probe devices for a probe based system, the cassette including a body having at least one probe receptacle arranged to accommodate at least one probe device, wherein, at the probe receptacle, at least one vacuum clamping member is arranged for selectively holding the at least one probe device under a retaining force.

The vacuum clamping members may include suction means configured to act on an underside portion of the probe devices for providing a vacuum fixture of the probe devices onto the body of the probe cassette.

The cassette may be transportable with a lid keeping the probes confined. The cassette may include a vacuum system which can be connected to a vacuum source before opening the lid. The vacuum will keep the probes in place when the lid is opened.

The cassette can be connected to the second source of vacuum in the probe based system, while still connected to the first vacuum source. Once connected to the second source of vacuum via the second fluid port, machine vacuum can be supplied to the vacuum clamping members of the probe cassette such that the fluid connection to the first source of vacuum through the first fluid port can be disconnected.

The probe cassette may carry an identification number and type number of the probes. This can for example be by a radio-frequency tag and/or a quick-response-code or other means. Used probes may be returned to the probe cassette, for example in a same spot from where they originate.

It is further envisaged that a vacuum chamber is arranged in the probe cassette with a valve for selectively providing fluid communication to the first source of vacuum via a connector tube. The connector tube may enable the first vacuum source (e.g. vacuum pump) and vacuum chamber to be in fluid communication with each other when the valve is opened. The vacuum chamber may also be formed by one or more passageways arranged in the body of the cassette.

Optionally, each corresponding passageway to one or more orifices at the receptacles may have a valve which is individually controllable by a controller.

The first source of vacuum may be an external source of vacuum (e.g. vacuum pump). It is also envisaged that the first source of vacuum is integrated within the probe cassette. In this way, the first fluid port may be omitted and the first vacuum source may be directly connected to the passageways leading to the apertures arranged at the receptacles.

According to an aspect, the invention provides for a probe cassette for storing, transporting and handling one or more probe devices for a probe based system, the cassette including a body having at least one probe receptacle arranged to accommodate a probe device, wherein, at the probe receptacle, a clamping member is arranged for selectively holding the probe device under a retaining force, wherein the clamping member is adjustable between a first state, in which the retaining force is sufficiently large such as to enable clamping of the probe device, and a second state, in which the retaining force is sufficiently small such as to allow release of the probe device.

It will be appreciated that the probe devices may be used in various types of scanning probe microscopy systems. The cassette may be arranged to be compatible with such systems enabling easy handling. The cassette may be also used for carrying probe based devices for other probe-based systems or instruments arranged for monitoring the interaction between the probe device and a sample to obtain information concerning one or more characteristics of the sample (e.g. topography, surface characterization, sub-surface characterization, etc.).

The probe devices may have a base from which a cantilever extends, the cantilever supporting a tip projecting therefrom. The tip can be arranged near a distal end of the cantilever. The cassette may be arranged to accommodate other types of probe devices.

The probe device may be configured to be useable in a probe based system such as an atomic force microscope or scanning probe microscope. Many variants are possible. In some examples, the probe device comprises a cantilever and a probe tip arranged for approaching and/or contacting a surface of a sample. This can be done during scanning of the probe on the surface. In some examples, the probe is coupled to an oscillating actuator or drive to oscillate the cantilever, for example at or near a resonant frequency. The actuator may be provided with an excitation signal for causing the actuator to drive the probe. Although operating near a resonant frequency or harmonic frequency may be advantageous, other frequencies can also be employed wherein the deflection amplitude of the probe tip is sufficiently large. It is also possible that the probe is not vibrated or only intermittently vibrated.

The probe tip can have various shapes (e.g. cone shaped) and dimensions. Often the probe tip is sensitive and prone to damage if the probe is not handled with sufficient care. The cassette according to the invention provides an improved handling of the probe devices, for example during transportation or handling. The probe tip can be arranged adjacent to a free end of the cantilever, however, other arrangements are possible. Also the cantilever can have various shapes, for example rectangular, triangular, combination of shapes, etc. However, other shapes are also possible, for example the cantilever may comprise a wider free end. Such a wider free end may bring a torsion mode closer to a first bending mode.

It will be appreciated that the retaining force may be any one or more of a tensile force, suction force, clamping force, vacuum force, electric or magnetic force, or any other useable force.

It will be appreciated that any of the aspects, features and options described in view of the cassette apply equally to the method and the described probe delivery package. It will also be clear that any one or more of the above aspects, features and options can be combined.

BRIEF DESCRIPTION OF THE DRAWING

The invention will further be elucidated on the basis of exemplary embodiments which are represented in a drawing. The exemplary embodiments are given by way of non-limitative illustration. It is noted that the figures are only schematic representations of embodiments of the invention that are given by way of non-limiting example.

In the drawing:

FIGS. 6a, 6b, 6c and 6d show a schematic diagram of a cassette;

DETAILED DESCRIPTION

Figure 1:
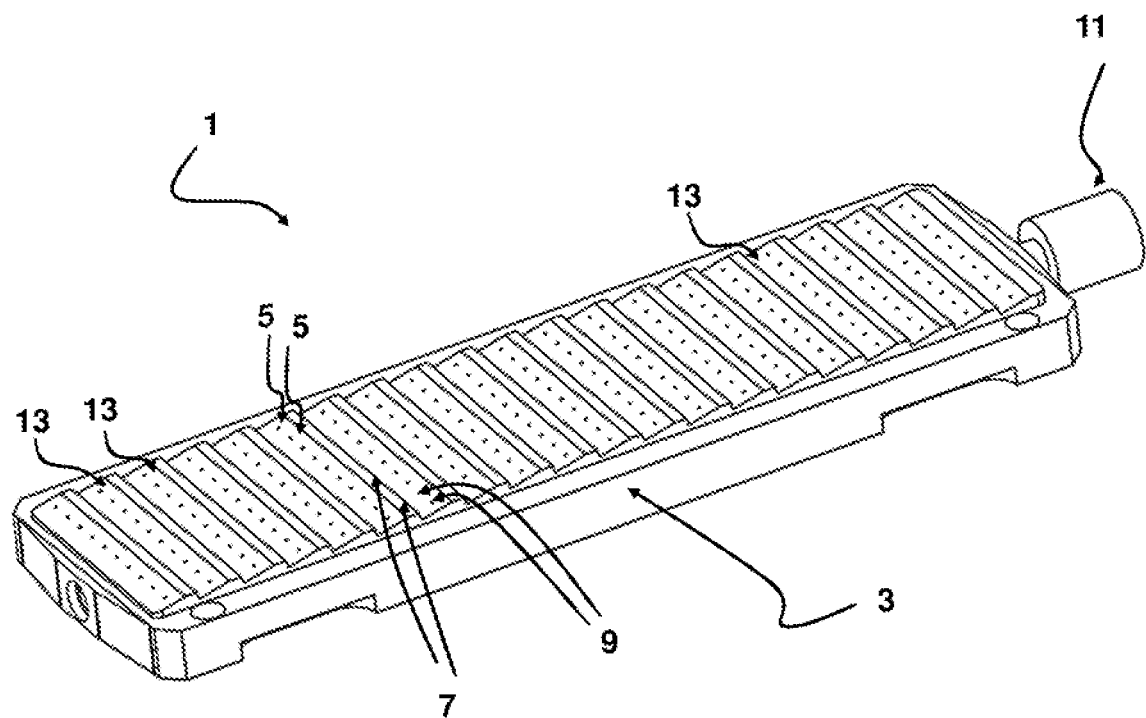
FIG. 1 shows in perspective view a schematic diagram of an embodiment of a cassette.

FIG. 1 shows in perspective view a schematic diagram of an embodiment of a probe cassette 1. The probe cassette 1 is arranged for storing, transporting and handling one or more probe devices (not shown in this figure) for a probe based system, such as a scanning probe microscope. The cassette 1 includes a body 3 having at least one probe receptacle 5 arranged to accommodate a probe device. At the probe receptacle 5, a vacuum clamping member 7 is arranged for selectively holding the probe device under a retaining force. An aperture 9 is arranged at each receptacle 5. The aperture 9 is arrange at the body of the cassette 1. During selective holding of the probe device, the aperture 9 is connectable to a vacuum pressure through a passageway arranged in the cassette body 3. The cassette 1 includes a first fluid port 11 connectable to a first source of vacuum for delivering the vacuum pressure.

The receptacles 5 may each form a slot adapted to receive a probe device. In this example, the cassette 1 includes a plurality of receptacles 5 arranged in a plurality of arrays 13. Each array 13 has ten receptacles 5 in this exemplary embodiment. Further, the cassette 1 has twenty successive arrays in total arranged next to each other. It will be appreciated that a different number of arrays and/or receptacles is possible. Many configurations are possible. Other types of receptacle arrangements are also possible. For example, one cassette may be arranged to accommodate for more than 100 probe devices, e.g. more than 200 probe devices.

By using the probe cassette 1, individual probe devices can be pre-loaded and transported to a remote location or a probe based system with reduced user intervention. A pre-loaded cassette 1 can be easily shipped in a probe device delivery package. Once delivered, the probe device delivery package and/or the cassette 1 or at least some part thereof can be directly mountable in the probe based system (e.g. AFM). During probe based system operation, the probe devices can then be automatically accessed by the probe based system.

The probe cassette may be interfaced with the probe based system. For example, once the probe cassette 1 is delivered, a lid can be removed or opened. The probe cassette 1 can then be placed in a mounting position of the probe based system, such as on a stage. Alternatively, the probe cassette or probe device delivery package can be introduced to the probe based system and then the lid can be opened within the probe based system. Advantageously, by means of the vacuum clamping members, the probe devices can be retained even when the lid is opened or removed, or further handling with the lid opened or removed. The yield of fully operational probe devices after transportation and handling can thus be improved significantly.

The receptacle 5 may include a support surface on which the probe device can rest, wherein on the support surface at least one vacuum aperture (opening) is arranged for enabling (selective) vacuum clamping. The body of the cassette may include a plurality of apertures (openings), wherein each aperture is arranged for providing vacuum clamping.

Figure 2A:
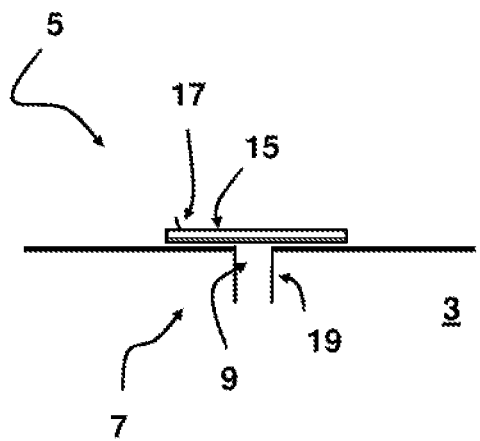
FIGS. 2a and 2b show in cross section a schematic diagram of a vacuum clamping member of a cassette.
Figure 2B:
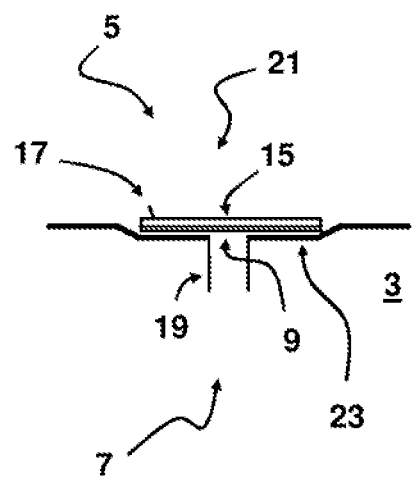

FIGS. 2a and 2b show in cross section a schematic diagram of a vacuum clamping member 7 of a cassette 1. One receptacle 5 is shown in cross section accommodating a probe device 15. Only a portion of the cassette 1 is shown in cross section. The probe device 15 can be selectively clamped in position by means of the vacuum clamping member 7. In this example, the probe device 15 is a cantilever-based probe device with a probe tip 17. It will be appreciated that the cassette may be arranged to receive other types of probe devices.

A vacuum clamping member 7 is arranged at the probe receptacle 5. The vacuum clamping member 7 is arranged to selectively retain the probe device 15 under a retaining force resulting from vacuum suction selectively induced by the clamping member 7 through an aperture 9. The aperture 9 is arranged on the body of the cassette 1 at the receptacle 5. During said selective retaining of the probe device, the aperture 9 is connectable to a vacuum pressure through a passageway 19 arranged in the cassette body 3. The cassette 1 includes a first fluid port 11 connectable to a first source of vacuum for delivering the vacuum pressure (not shown).

The probe cassette 1 may include a plurality of receptacles as depicted in FIGS. 2a and 2b. For example, the probe cassette 1 may include a plurality of arrays/rows of probe receptacles, each array including a plurality of receptacles 5. Each probe receptacle 5 can be configured to receive a probe device. In this example, the probe device 15 is received in the receptacle with tip-up. However, it is also envisaged that the receptacle is adapted to receive the probe devices 15 with tip-down. The probe receptacles can be tailored to accommodate the probe devices 15 and can be positioned closely adjacent to one another to accommodate as many probe devices as possible, thereby improving the packaging efficiency of the probe cassette 1.

In FIG. 2b, a seat 21 is formed at the probe receptacle 5 adapted to the shape and dimensions of the probe device 15. The seat 21 is formed by a lowered/recessed surface 23 on the body 3 of the cassette 1. The seat can be dimensioned such as to facilitate positioning of the probe device 15 at the probe receptacle 5 allowing selective holding of the probe device 15 by means of the vacuum clamping member.

The vacuum clamping members 7 may be configured to provide a vacuum clamping force that is strong enough to hold the probe device in place, yet not so great to compromise the integrity of the probe devices. By means of the vacuum clamping members the probe devices can be held against a surface of the body of the probe cassette with a precision force, yet without damaging the probe device. Furthermore, this vacuum clamping force exerted on the probe devices can be accurately adjustable. Optionally, the vacuum force can be selected depending on the probe device type.

Figure 3A:
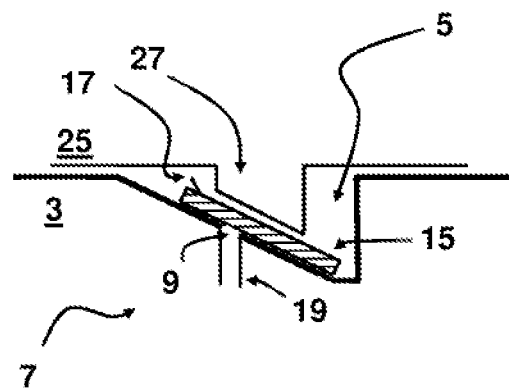
FIGS. 3a and 3b show in cross section a schematic diagram of a vacuum clamping member of a cassette.
Figure 3B:
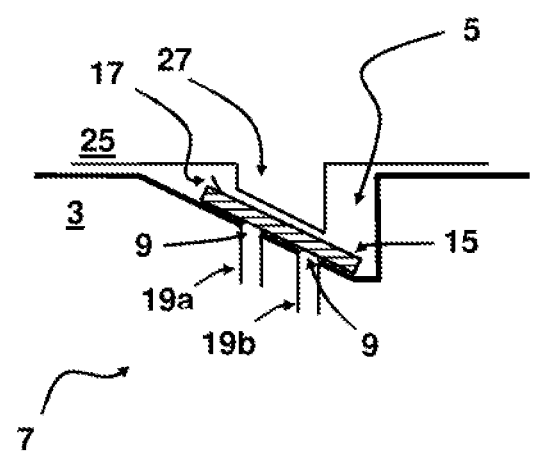

FIGS. 3a and 3b show in cross section a schematic diagram of a vacuum clamping member 7 of a cassette 1. A lid 25 is mountable on the probe cassette 1 substantially covering the at least one receptacle 5. The lid 25 may include retaining means (not shown) for retaining the one or more probe devices 15 on the body 3 of the probe cassette 1. The lid 25 in closed position may for instance form-lock the probe device 15 at the receptacle 5. Advantageously, the vacuum clamping member 7 can retain the probe device in position at the probe receptacle 5 using a retaining force induced by vacuum, even when the lid is opened and/or removed. The lid 25 may for instance be opened and/or removed when the cassette is to be placed in the probe based system. Also during these operations the probe device 15 can be kept in position on the body 3 of the cassette 1. In the embodiment of FIG. 3b the clamping member 7 has two apertures 9 and two passageways 19 connected to said respective apertures 9 at the probe receptacle 5. It will be appreciated that other configurations are also possible for achieving vacuum clamping. The body 3 of the cassette 1 includes a slit with an inclined recessed surface adapted to accommodate the probe device 15.

The probe devices 15 can be secured between the lid 25 and the body 3 of the probe cassette 1 when the lid 25 is in a closed positioned. The cassette may withstand shocks including sudden movements and handling. By means of the vacuum clamping member, the probe devices 15 may also be retained even if the lid 25 is removed or opened. It is possible that only a selective vacuum clamping is employed when the lid 25 no longer provides clamping (i.e. opened/removed).

The vacuum-based retaining force securing the probe device 15 to the body 3 of the probe cassette 1 can be sufficiently large such that the probe devices can withstand jostling or jarring during delivery during transport or handling, without comprising the probe device 15 integrity.

Figure 4:
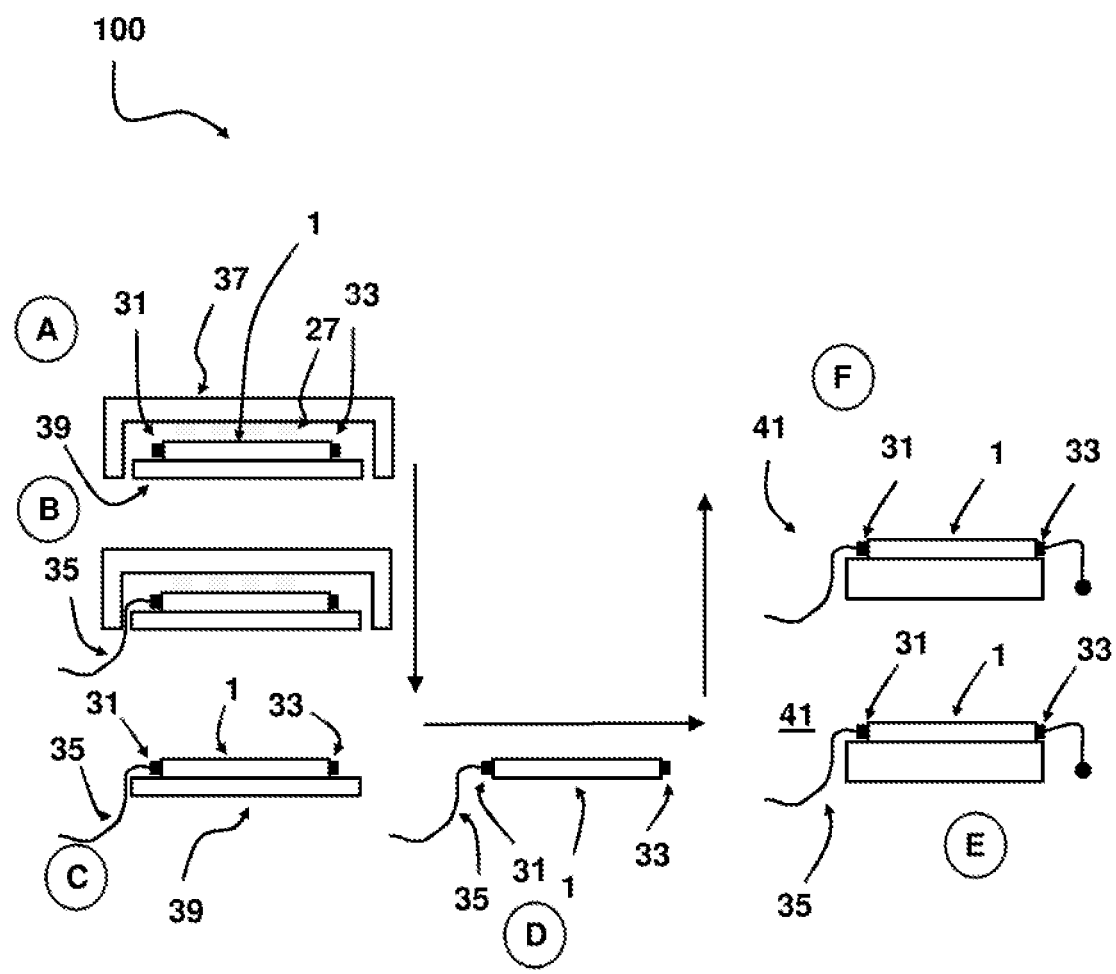
FIG. 4 shows a schematic diagram of a process.

FIG. 4 shows a schematic diagram of a process 100 for delivering probe devices in a probe based system. The probe cassette 1 includes a body having at least one probe receptacle arranged to accommodate a probe device. The probe device is selectively held under a retaining force at the probe receptacle by means of a vacuum clamping member. At the receptacle at least one aperture is provided, which is during selective holding of the probe device connected to a vacuum pressure, through a passageway arranged in the cassette body. The probe cassette is provided with a first fluid port 31 connectable to a first source of vacuum for delivering the vacuum pressure. The fluid connection is achieved by means of a flexible tube 35.

The probe cassette 1 further provided with a second fluid port 33 connectable to a second source of vacuum. The retaining force exerted by means of the vacuum clamping member is adjustable by controlling the vacuum pressure. Furthermore, a lid 37 is mounted on the probe cassette 1 substantially covering the at least one receptacle. Optionally, the lid 37 comprises retaining means 27 for retaining the one or more probe devices on the body of the probe cassette 1. In this example, the cassette 1 is initially housed in a probe cassette delivery package with a base 39 and a lid 37. It will be appreciated that the lid 37 and/or base 39 may be a part of the cassette and/or integrated with the cassette 1.

The probe device(s) can be selectively held in position at the probe receptacle by means of the vacuum clamping member when the lid 37 is to be opened and/or removed. The first fluid port 31 is connectable to the first source of vacuum with the lid 37 being closed.

In the process 100, the first fluid port 31 is connected to the first source of vacuum (step B). The cassette 1, lid 37, base 39 and/or optional package delivery package are arranged for allowing this while the lid 37 is in a closed position. Vacuum is then provided to the cassette 1 enabling the vacuum clamping member to retain the probe devices in position accommodated on the probe cassette 1 by exerting a retaining force. Then, the lid 37 can be removed from the cassette 1 while the probe devices are held in position by means of the vacuum clamping members of the cassette 1 (step C). The probe cassette 1 is then moved to the probe based system with the first fluid port 31 connected to the first source of vacuum providing vacuum (step D). The probe cassette 1 inserted in a chamber 41 of the probe based system is then connected to the second source of vacuum via the second fluid port 33 of the probe cassette 1 (step E). The second source of vacuum is a machine vacuum of the probe based system. The first fluid port 31 is then disconnected from the first source of vacuum (step F). Used probes in the probe based system may be returned to the cassette 1.

The probe based system may be able to selectively access probe devices positioned on the probe cassette. In this regard, one or more selected probe device may be loaded onto one or more probe mounts of the probe based system using means for retrieving/retaining probe devices from the probe cassette. Mechanical clamping, (electro)magnetic clamping, electrostatic force clamping, adhesive clamping and/or vacuum clamping may be employed.

Figure 5A:
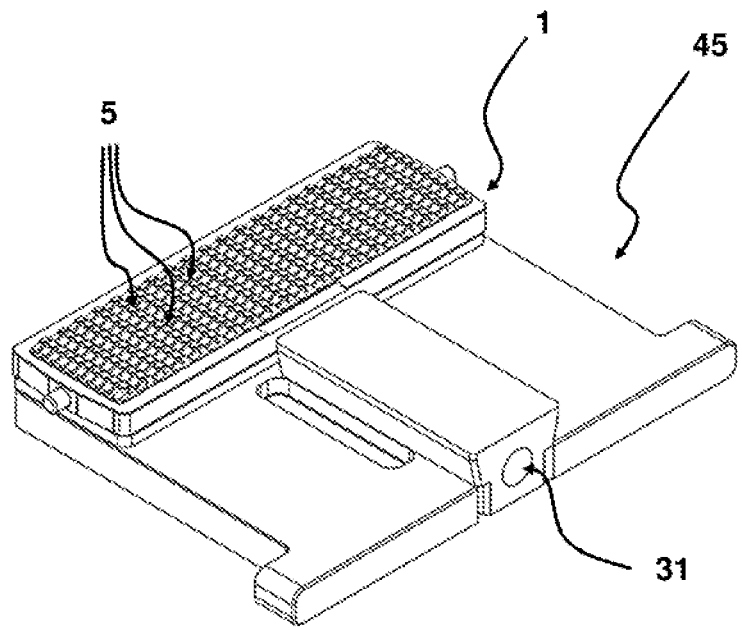
FIGS. 5a and 5b show in perspective view a schematic diagram of cassette.
Figure 5B:
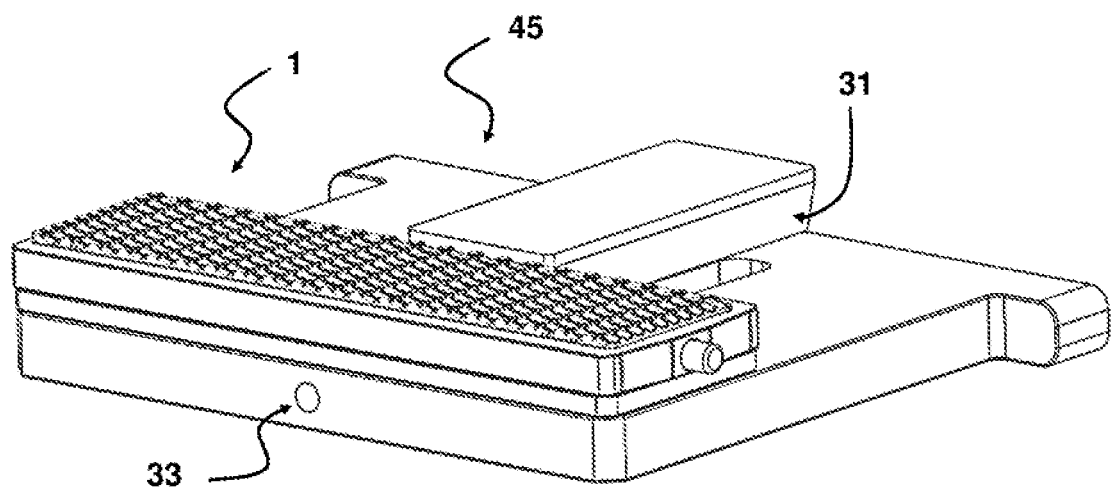

FIGS. 5a and 5b show in perspective view a schematic diagram of cassette 1. In FIG. 5b the view is rotated with respect to the perspective view shown in FIG. 5a. The cassette 1 includes a first fluid port 31 and a second fluid port 33. The fluid ports 31, 33 are arranged in a fluid connection system 45. The probe cassette 1 includes a series of probe vacuum retainers arranged for retaining the probe devices disposed in the probe receptacles 5 of the body of the cassette 1.

FIGS. 6a, 6b, 6c and 6d show a schematic diagram of a cassette 1. The cassette 1 is positionable on a mechanical stage of the probe based system. The vacuum clamping members are configured to impose a vacuum clamping force on the probe devices sufficient to hold the probe devices. The cassette 1 includes two fluid ports, namely a first fluid port 31 and a second fluid port 33. The first fluid port is connectable to a first source of vacuum for providing vacuum to the vacuum clamping members. Further, the second fluid port is connectable to a second source of vacuum for providing vacuum to the vacuum clamping members. Vacuum clamping may be used selectively during certain steps, e.g. in relation to removing a lid, handling the cassette 1 with the lid removed or opened, etc.

A probe mount of the probe based system can be manipulated to select a probe device and position the probe device for measuring a sample. It can be possible to continue making probe based system measurements without manually replacing individual probe devices each time the operator wishes to use a new probe device. Each new probe device can be selected from probe cassette disposed on a mechanical stage (e.g. X-Y translation stage). The probe based system may be arranged to automatically load the probe device onto the probe mount.

Figure 7:
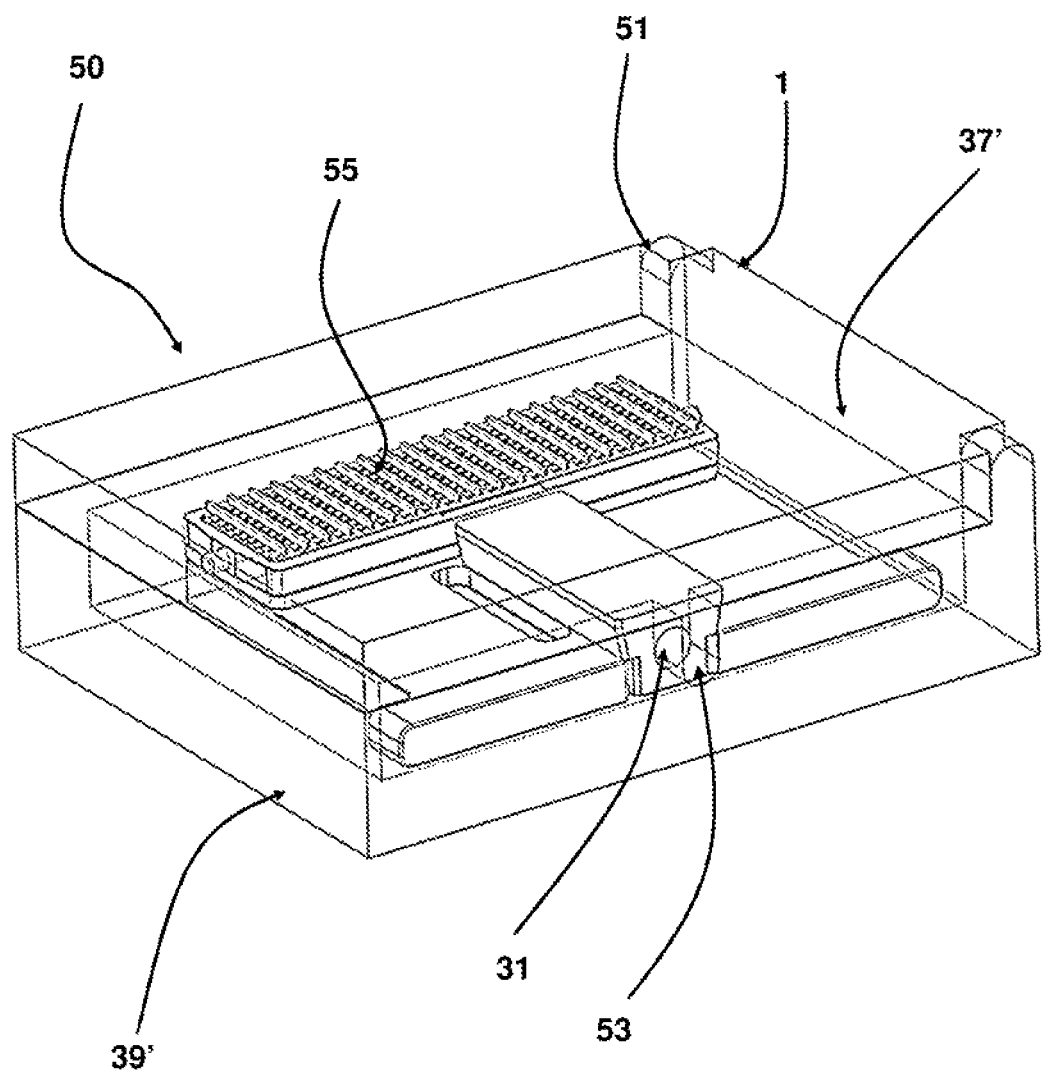
FIG. 7 shows in perspective view a schematic diagram of a probe delivery package and a cassette.

FIG. 7 shows in perspective view a schematic diagram of a probe delivery package 50 and a cassette 1 housed therein. The cassette 1 is arranged to be receivable in the probe device delivery package 50. The probe device delivery package 50 includes a package base 39' and a package lid 37' connected with each other. The package lid 37' is mountable over the body of the cassette 1 so as to substantially cover the at least one receptacle arranged thereon. The first fluid port 31 is connectable to the first source of vacuum with the package lid 37' in a closed position. The package lid 37' is movably arranged with respect to the package base 39' by means of a hinge 51. In this way, the package lid 37' can be opened up for removal of the cassette 1. In this embodiment, the package base 39' includes an port opening 53 arranged for allowing fluid connection between the first fluid port 31 of the probe cassette 1 and an external vacuum source while the probe device delivery package 50 is closed (i.e. the package lid 37' in a closed position). Hence, in this way, the vacuum clamping members of the probe cassette can be selectively operated before the package lid 37' is opened, resulting in an improved clamping system.

Optionally, the lid includes a series of mechanical retainers 55 arranged for interfacing with the probe devices placed in the receptacles 5, wherein a distal edge of the mechanical retainers 55 impinge upon the probe devices 15 thereby improving in holding the probe devices in the receptacles. A form lock may be achieved in this way. Optionally, the probe devices are sandwiched between the lid 37' and the body of the cassette 1. The vacuum clamping members can be operated such as to hold the probe devices within cassette under a vacuum clamping force (cf. suction force). At the receptacle, a vacuum aperture/opening is arranged for contacting at least a portion of the probe device for retaining the probe device on the base of the cassette when the lid is removed or opened, and/or when the lid is handled without the lid covering the plurality of receptacles (opened/removed position).

By means of the vacuum clamping member, the vacuum clamping force exerted on the probe devices can be adjusted. Different vacuum clamping forces can be selected. Optionally, the vacuum clamping force exerted by means of the vacuum retaining mechanism is variable and can be controlled by means of a controller adjusting the imposed vacuum conditions. A configurable suction force can be exerted on the probe devices for securing said probe devices to the body of the probe cassette 1 during transportation and/or handling of the probe cassette 1.

Figure 8A:
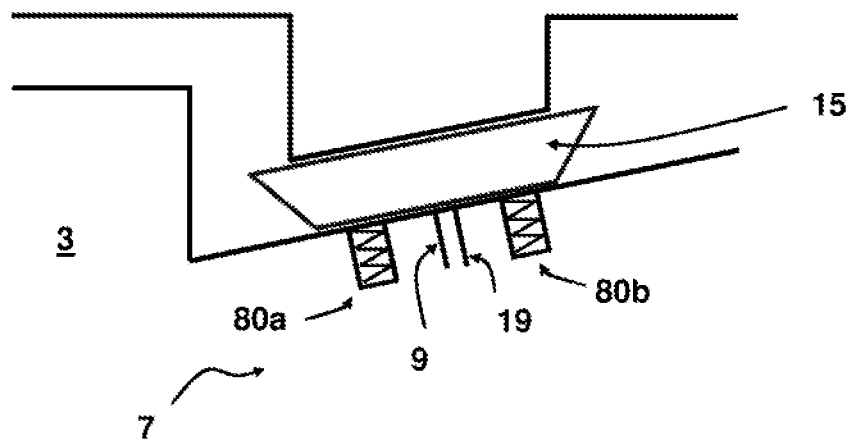
FIGS. 8a and 8b show in cross section a schematic diagram of a clamping member of a cassette
Figure 8B:
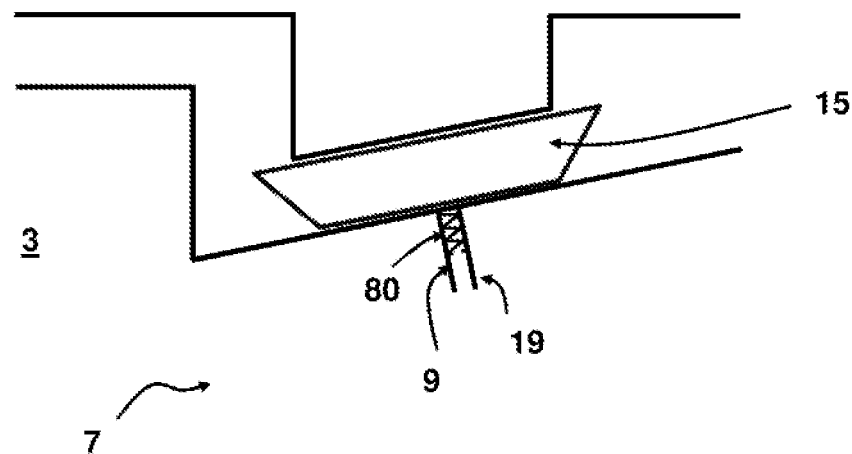

FIGS. 8*a* and 8*b* show in cross section a schematic diagram of a clamping member of a cassette 1. A lid 25 is connected to the body 3 of the cassette 1. In the shown closed position of the lid 25, the probe device 15 can be held by one or more clamping members. In FIG. 8*a*, the cassette includes a vacuum clamping member 7 arranged for selectively holding the probe device under a retaining force. An aperture 9 is arranged at each receptacle 5. The aperture 9 is arrange at the body 3 of the cassette 1. During selective holding of the probe device, the aperture 9 is connectable to a vacuum pressure through a passageway 19 arranged in the cassette body 3. Additionally, a biasing member 80*a*, 80*b* is arranged at the body 3 of the cassette 1. The biasing member 80*a*, 80*b* is configured to apply a biasing force on the probe device 15. The biasing member 80*a*, 80*b* can be configured to push the probe device 15 against the lid in order to clamp it in position at the receptacle 5. The biasing force generated by means of the biasing member 80*a*, 80*b* is smaller than the clamping force induced by the vacuum clamping member 7. In this way, the vacuum clamping member can overrule the clamping of the biasing member 80*a*, 80*b*, such that the vacuum clamping member 7 can retain the probe device in position at the probe receptacle 5 even when the lid is opened and/or removed. The lid 25 may for instance be opened and/or removed when the cassette is to be placed in the probe based system. Also during these operations the probe device 15 can be kept in position on the body 3 of the cassette 1.

In the embodiment of FIG. 8*b* the biasing member is integrated within the aperture 9 of the vacuum clamping member 7. A smaller design can be achieved in this way. Furthermore, the design of the cassette can be simplified, reducing the costs of manufacturing. Also in this embodiment, the vacuum induced force can be greater than spring force to ensure the probe device is clamped at the receptacle during handling, transport, etc. (e.g. picking up).

In an alternative example, the biasing member is selectively actuatable, such that only in an activated position the biasing force is applied. In this way, it may not be required that the clamping force induced by the vacuum clamping member 7 is larger than the force induced by the biasing member.

Figure 9A:
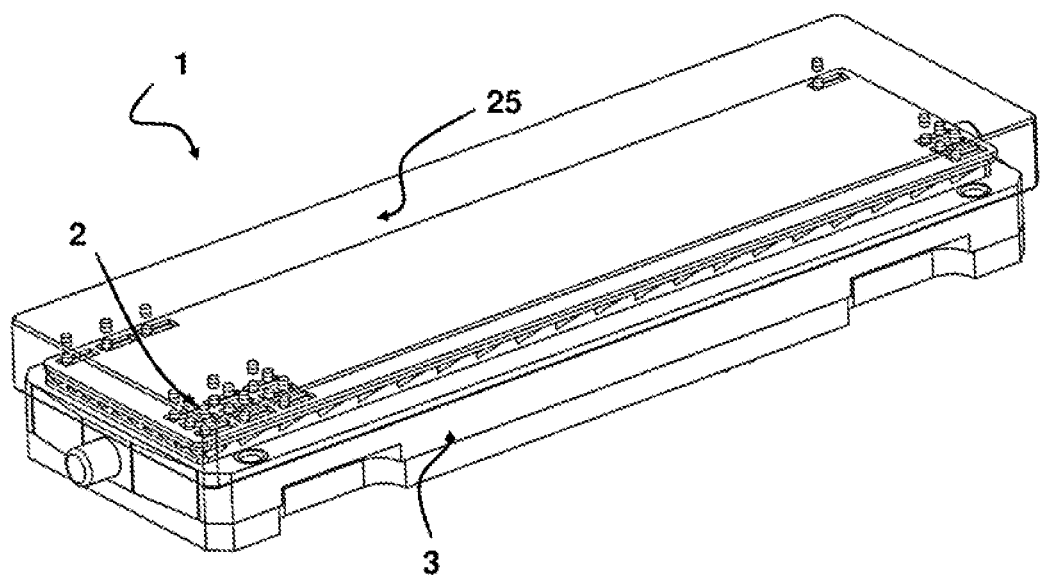
FIGS. 9a and 9b show in perspective view a schematic diagram of a cassette.
Figure 9B:
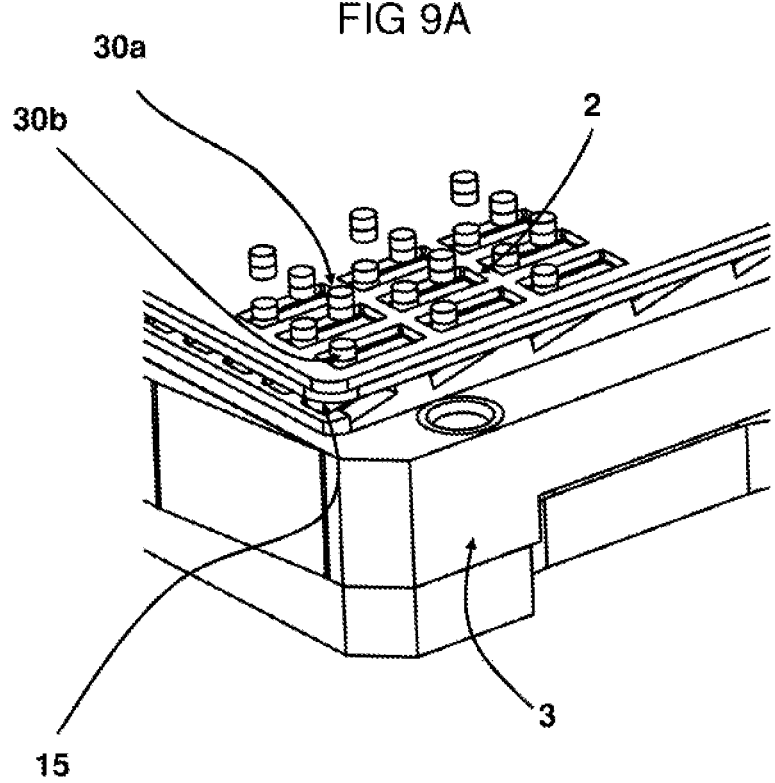

FIGS. 9*a* and 9*b* show in perspective view a schematic diagram of a probe cassette 1. The clamping unit 2 includes two magnets for providing the clamping force. In this example, two static/permanent magnets 30*a*, 30*b* are arranged. The magnets 30*a*, 30*b* are configured such that when the lid is closed the like poles of the magnets 30*a*, 30*b* approach each other inducing a required clamping force for retaining the probe devices 15 in position at the receptacle 5 at which it is received. The like poles of the magnets 30*a*, 30*b* repel each other, and by changing a gap distance therebetween in the closed position of the lid, the clamping force can be adjusted. The clamping device is adjustable in a plurality of second positions in which the probe device is clamped, each second positions having a different clamping force.

In the shown example, a first magnet 30*a* and a second magnet 30*b* are arranged such that like poles of the magnets 30*a*, 30*b* are facing each other. The clamping unit 2 is arranged such that the first magnet 30*a* and second magnet 30*b* are brought closer to each other when the lid 25 is closed, generating a force used for clamping the probe device 15 at the receptacle 5.

The magnets 30*a*, 30*b* are not in contact with each other and are opposed to each other when the lid 25 of the probe cassette 1 is closed. The magnets 30*a*, 30*b* interact with each other when the lid 25 is closed, generating a clamping force. Like poles (e.g. N, N or S, S) of each magnet 30*a*, 30*b* of the clamping unit 2 face each other. The position of at least one of the two magnets 30*a*, 30*b* relative to each other can be adjusted, such that the resulting clamping force is adjustable at least when the lid is closed. Although permanent magnets are employed in this example, it will be appreciated that also the arrangement of electromagnet is envisaged. In the shown example only one clamping unit 2 is shown for one receptacle receiving a single probe device 15. However, a clamping unit 2 may be arranged at each receptacle. It is also envisaged that a plurality of probe devices 15 are received at the receptacle 5.

Figure 10A:
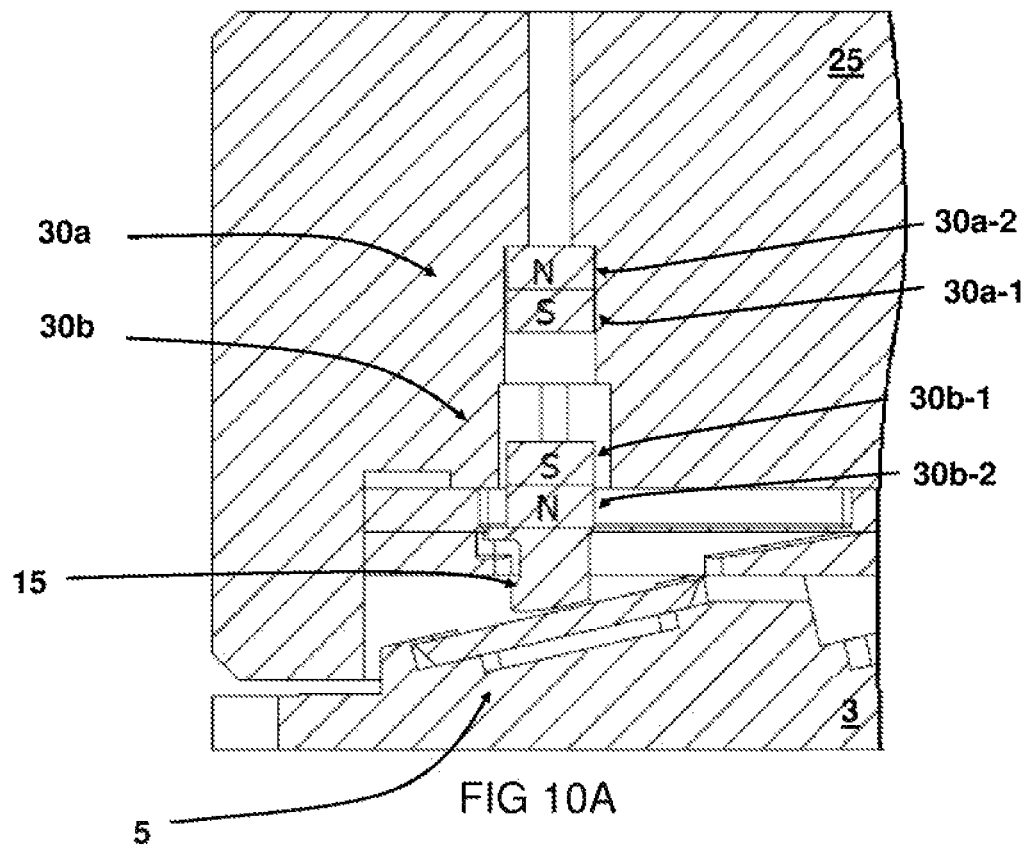
FIGS. 10a and 10b show in cross section a schematic diagram of a cassette at a receptacle.
Figure 10B:
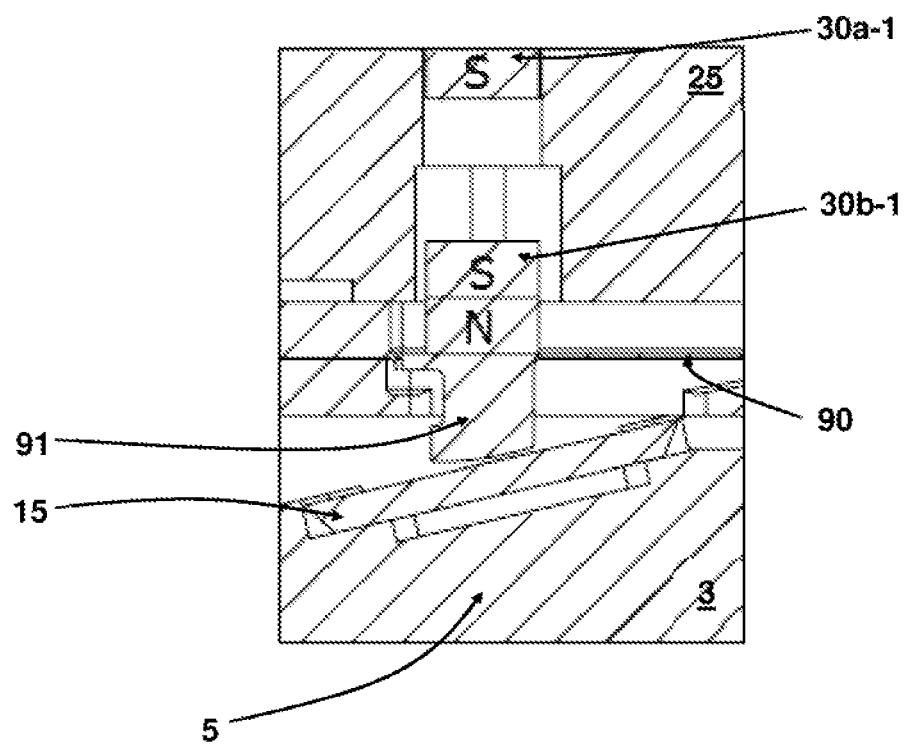

FIGS. 10a and 10b show in cross section a schematic diagram of a cassette at a receptacle. The clamping unit 2 includes a first magnet 30a and a second magnet 30b which are both permanent magnets with like poles facing each other. The clamping unit is arranged such that the two magnets 30a, 30b are aligned so that the like poles face each other for repulsion. The resulting clamping force is achieved when the lid 25 is closed and/or placed on the body 3 of the probe cassette 1. By adjusting the distance between the two magnets 30a, 30b when the lid is in a closed position, the clamping force can be adjusted. The clamping unit 2 includes an adjustment member for adjusting the clamping force, wherein the clamping unit is selectively operable from a first position, in which the clamping force is insufficient to provide clamping of the probe device 5 at the receptacle 15 (e.g. when lid is open), to a plurality of second positions (e.g. when lid is closed), in which the clamping force restricts movement of the probe device 5 at the receptacle, the plurality of second positions providing different clamping forces for restricting the probe device 5 to a different extent.

In the shown example in FIGS. 10a and 10b, the first magnet 30a is arranged in the lid 25 of the probe cassette 1, and a second magnet is arranged in a guiding member 90. The clamping force for retaining the probe device at the receptacle is based on repulsion force between the two magnets 30a, 30b. The first magnet 30a can be fixed to the cover 25 and the second magnet 30b can be fixed on the guiding member 90. The second magnet 30b can be guided such that a probe clamping pin 91 is pushed the probe device 15. The guiding member 90 can be a guiding flexure. The guiding flexure 90 can be configured to guide the probe clamping pin 91 towards the probe device 15 when the lid 25 of the probe cassette 1 is closed, and to move the probe clamping pin 91 away from the probe device when the lid 25 of the probe cassette is opened or removed from the cassette body 3. It will be appreciated that other biasing members may also be used as guiding member 90.

The probe cassette 1 includes a vacuum clamping member 7 arranged at each probe receptacle 5. The vacuum clamping member 7 is arranged to selectively retain the probe device 15 under a retaining force resulting from vacuum suction selectively induced by the clamping member 7 through an aperture 9. The aperture 9 is arranged on the body 3 of the cassette 1 at the receptacle 5. During said selective retaining of the probe device, the aperture 9 is connectable to a vacuum pressure through a passageway 19 arranged in the cassette body 3. The cassette 1 includes a first fluid port connectable to a first source of vacuum for delivering the vacuum pressure.

Advantageously; the vacuum hole clamping unit 7 may be arranged for retaining the probe device in position at the receptacle 5 even when the lid 25 is opened or removed from the cassette body 3.

The retaining force may be any one or more of a tensile force, suction force, clamping force, vacuum force, electric or magnetic force, or any other useable force in accordance with the above-mentioned examples.

It will be appreciated that the method may include computer implemented steps. All above mentioned steps can be computer implemented steps. Embodiments may comprise computer apparatus, wherein processes performed in computer apparatus. The invention also extends to computer programs, particularly computer programs on or in a carrier, adapted for putting the invention into practice. The program may be in the form of source or object code or in any other form suitable for use in the implementation of the processes according to the invention. The carrier may be any entity or device capable of carrying the program. For example, the carrier may comprise a storage medium, such as a ROM, for example a semiconductor ROM or hard disk. Further, the carrier may be a transmissible carrier such as an electrical or optical signal which may be conveyed via electrical or optical cable or by radio or other means, e.g. via the internet or cloud.

Some embodiments may be implemented, for example, using a machine or tangible computer-readable medium or article which may store an instruction or a set of instructions that, if executed by a machine, may cause the machine to perform a method and/or operations in accordance with the embodiments.

Herein, the invention is described with reference to specific examples of embodiments of the invention. It will, however, be evident that various modifications, variations, alternatives and changes may be made therein, without departing from the essence of the invention. For the purpose of clarity and a concise description features are described herein as part of the same or separate embodiments, however, alternative embodiments having combinations of all or some of the features described in these separate embodiments are also envisaged and understood to fall within the framework of the invention as outlined by the claims. The specifications, figures and examples are, accordingly, to be regarded in an illustrative sense rather than in a restrictive sense. The invention is intended to embrace all alternatives, modifications and variations which fall within the spirit and scope of the appended claims. Further, many of the elements that are described are functional entities that may be implemented as discrete or distributed components or in conjunction with other components, in any suitable combination and location.

The drawings are not necessarily drawn to scale. Furthermore, in the figures, elements having the same function and structure are given by identical numerals, and a detailed explanation as to these elements will be omitted.

Moreover, all details of the invention may be substituted with other technically equivalent elements and the materials used, as well as the shapes and dimensions of the various components, may vary according to requirements.

The cassette may be usable with many types of probe-based systems. Next to scanning probe microscopes, other probe based systems are also envisaged. It will be appreciated that an atomic force microscope (AFM) can also be used for manipulating portions (e.g. atoms) of a substrate using one or more probe devices. In such a case, the scanning probe microscope may also be called a scanning probe manipulator. The invention may be employable in other machines or systems, for example, machines using fragile units (e.g. substrates, chips) which must be changed periodically. The fragile units may have small dimensions and require a delicate handling (prone to damage if not handled with extreme care). The cassette according to the invention may be employed for transportation and handling of said fragile units.

It will be appreciated that vacuum can be understood as a under-pressure resulting in a suction force. Vacuum can be used for achieving clamping. The skilled person is aware of the vacuum pressures needed for achieving a vacuum clamping. Different under-pressures or vacuum pressures can be used for achieving a clamping retaining force. The clamping can be improved by providing a sealing member at the interface between the clamping unit and the probe device.

When a feature or element is herein referred to as being "on" another feature or element, it can be directly on the other feature or element or intervening features and/or elements may also be present. It will also be understood that, when a feature or element is referred to as being "connected", "attached" or "coupled" to another feature or element, it can be directly connected, attached or coupled to the other feature or element or intervening features or elements may be present.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

"Optional" or "optionally" means that the subsequently described event or circumstance may or may not occur, and that the description includes instances where said event or circumstance occurs and instances where it does not.

In the drawings, which are not necessarily drawn to scale, like numerals may describe similar components in different views. Like numerals having different letter suffixes may represent different instances of similar components.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. A probe cassette for storing, transporting and handling one or more probe devices for a probe based system, the cassette including a body having at least one probe receptacle arranged to accommodate a probe device, wherein, at the probe receptacle, a vacuum clamping member is arranged for selectively holding the probe device under a retaining force, wherein at the receptacle at least one aperture is arranged, which is, during selective holding of the probe device, connectable to a vacuum pressure through a passageway arranged in the cassette body, wherein the cassette includes a first fluid port connectable to a first source of vacuum for delivering the vacuum pressure, wherein the probe cassette includes a second fluid port connectable to a second source of vacuum, said second fluid port being arranged to provide vacuum to the vacuum clamping member, independently of vacuum provided by the first fluid port.

2. The probe cassette according to claim 1, wherein the vacuum clamping member is adjustable between a first position, in which the vacuum pressure is sufficiently low for enabling vacuum clamping of the probe device, and a second position, in which the vacuum pressure is sufficiently high for allowing release of the probe device.

3. The probe cassette according to claim 1, wherein the cassette further includes a lid mountable on the cassette substantially covering the at least one receptacle, the lid being configured to retain the one or more probe devices on the body of the cassette, wherein the first fluid port is connectable to the first source of vacuum with the lid in a closed position.

4. The probe cassette according to claim 1, wherein the body of the cassette has a package lid of a probe device delivery package mounted thereon, to substantially cover the at least one probe receptacle, wherein the package lid is connectable to a package base of the probe device delivery package, and wherein at least one of the package lid or the body of the cassette is configured to retain the one or more probe devices on the body of the cassette, wherein the first fluid port is connectable to the first source of vacuum with the package lid in a closed position.

5. The probe cassette according to claim 1, wherein the cassette includes a controller, wherein the controller is configured to adjust the retaining force exerted by the vacuum clamping member by controlling the vacuum pressure.

6. The probe cassette according to claim 5, wherein the vacuum clamping member is adjustable between a first position, in which the vacuum pressure is sufficiently low for enabling vacuum clamping of the probe device, and a second position, in which the vacuum pressure is sufficiently high for allowing release of the probe device.

7. The probe cassette according to claim 5, wherein the cassette further includes a lid mountable on the cassette substantially covering the at least one receptacle, the lid being configured to retain the one or more probe devices on the body of the cassette, wherein the first fluid port is connectable to the first source of vacuum with the lid in a closed position.

8. The probe cassette according to claim 5, wherein the body of the cassette has a package lid of a probe device delivery package mounted thereon, to substantially cover the at least one probe receptacle, wherein the package lid is connectable to a package base of the probe device delivery package, and wherein at least one of the package lid or the body of the cassette is configured to retain the one or more probe devices on the body of the cassette, wherein the first fluid port is connectable to the first source of vacuum with the package lid in a closed position.

9. The probe cassette according to claim 1, wherein the vacuum clamping member includes a seal configured to provide a sealing interface with the probe device in order to substantially prevent leakage of gas.

10. The probe cassette according to claim 1, wherein the cassette includes a plurality of receptacles arranged in at least one array.

11. The probe cassette according to claim 1, wherein the cassette is mountable in a probe based system such that the one or more probe devices can be automatically loaded onto a probe mount of the probe based system.

12. A method of storing and transporting probe devices for a probe based system, the method including providing a probe cassette including a body having at least one probe receptacle arranged to accommodate a probe device, wherein the probe device is selectively held under a retaining force at the probe receptacle by a vacuum clamping member, wherein at the receptacle at least one aperture is provided, which is during selective holding of the probe device connected to a vacuum pressure, through a passageway arranged in the cassette body, wherein the probe cassette is provided with a first fluid port connectable to a first source of vacuum for delivering the vacuum pressure, wherein the probe cassette is provided with a second fluid port connectable to a second source of vacuum, said second source of vacuum being different from said first source of vacuum, the method further including:

moving the probe cassette to the probe based system with the first fluid port connected to the first source of vacuum, connecting the second source of vacuum to the second fluid port of the probe cassette, the second source of vacuum being a machine vacuum of the probe based system, and disconnecting the first fluid port from the first source of vacuum.

13. The method according to claim 12, wherein the retaining force exerted by the vacuum clamping member is adjustable by controlling the vacuum pressure.

14. The method according to claim 12, wherein a lid is mounted on the probe cassette substantially covering the at least one receptacle, the lid being configured to retain the one or more probe devices on the body of the probe cassette, wherein the method includes holding the probe device in position at the probe receptacle by the vacuum clamping member when the lid is to be opened and/or removed.

15. The method according to claim 14, wherein the first fluid port is connectable to the first source of vacuum with the lid being closed.

16. The method according to claim 12, wherein the cassette includes a controller, wherein the controller is configured to adjust the retaining force exerted by the vacuum clamping member by controlling the vacuum pressure.

17. The method according to claim 12, wherein the vacuum clamping member includes a seal configured to provide a sealing interface with the probe device in order to substantially prevent leakage of gas.

* * * * *